(12) United States Patent  
Miyazaki

(10) Patent No.: US 8,938,875 B2  
(45) Date of Patent: Jan. 27, 2015

(54) COMPONENT ALIGNING APPARATUS AND ELECTRONIC COMPONENT MANUFACTURING METHOD

(75) Inventor: Toshiki Miyazaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 365 days.

(21) Appl. No.: 13/303,323

(22) Filed: Nov. 23, 2011

(65) Prior Publication Data

US 2012/0297608 A1 Nov. 29, 2012

Related U.S. Application Data

(63) Continuation of application No. PCT/JP2010/058716, filed on May 24, 2010.

(30) Foreign Application Priority Data

May 27, 2009 (JP) ................................ 2009-128153

(51) Int. Cl.
| | |
|---|---|
| *B23P 19/00* | (2006.01) |
| *H01G 4/005* | (2006.01) |
| *H01G 4/30* | (2006.01) |
| *H01G 13/00* | (2013.01) |

(52) U.S. Cl.
CPC ............... *H01G 4/005* (2013.01); *H01G 4/30* (2013.01); *H01G 13/00* (2013.01)
USPC ................ 29/758; 29/759; 29/760; 29/832; 414/590; 414/680; 414/749.4; 414/815

(58) Field of Classification Search
CPC .... B23P 19/002; B23P 19/006; B23P 19/007; H05K 13/0413; H05K 13/0404; H01G 13/00; H01G 4/005

USPC ............ 29/758, 759, 760, 832; 414/590, 680, 414/749.4, 815
See application file for complete search history.

(56) References Cited

U.S. PATENT DOCUMENTS

| | | | |
|---|---|---|---|
| 2002/0014202 A1 | 2/2002 | Onodera et al. | |
| 2005/0089628 A1 | 4/2005 | Sanada et al. | |
| 2009/0126188 A1* | 5/2009 | Sakai et al. | ..................... 29/832 |

FOREIGN PATENT DOCUMENTS

| | | |
|---|---|---|
| JP | 63-172126 U | 11/1988 |
| JP | 05-198463 A | 8/1993 |

(Continued)

OTHER PUBLICATIONS

Official Communication issued in International Patent Application No. PCT/JP2010/058716, mailed on Aug. 17, 2010.

*Primary Examiner* — Peter DungBa Vo  
*Assistant Examiner* — Jeffrey T Carley  
(74) *Attorney, Agent, or Firm* — Keating & Bennett, LLP

(57) ABSTRACT

A component aligning apparatus includes a component aligning jig, in which electronic components to be aligned have a rectangular parallelepiped shape whose length dimension is L, width dimension is W, and thickness dimension is T, the component aligning jig includes electronic component accommodating recesses opening on a surface, the depth Z of the accommodating recesses is shorter than the length L of the electronic components so that a single electronic component is held in each of the electronic component accommodating recesses while partially projecting upwards from each of the recesses with the WT surface on one side facing up, and letting s be the shortest separation that is larger than the thickness T and is the narrowest distance between opposing inside surfaces of each of the accommodating recesses when each of the accommodating recesses is seen in plan view, W>S>T.

4 Claims, 14 Drawing Sheets

(56) References Cited

FOREIGN PATENT DOCUMENTS

| JP | 2001-345240 | A | 12/2001 |
| JP | 2003-297705 | * | 10/2003 | ............ H01G 13/00 |
| JP | 2003-297705 | A | 10/2003 |
| JP | 2009-105312 | A | 5/2009 |
| KR | 10-0658305 | B1 | 12/2006 |

* cited by examiner

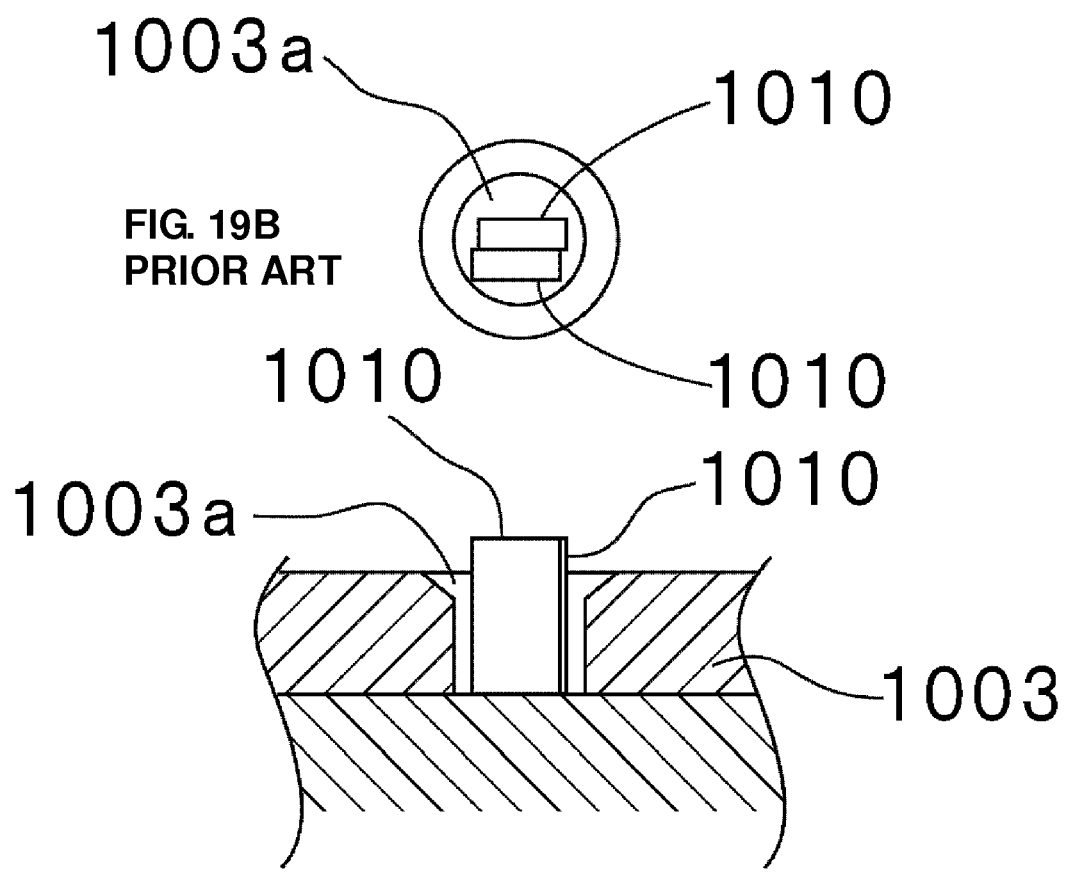

COMPONENT ALIGNING APPARATUS AND ELECTRONIC COMPONENT MANUFACTURING METHOD

BACKGROUND OF THE INVENTION

1. Field of the Invention

The present invention relates to an apparatus for aligning electronic components such as ceramic electronic components, and an electronic component manufacturing method using the apparatus, for example, and relates to a component aligning apparatus for aligning electronic components when forming external electrodes, and an electronic component manufacturing method using the apparatus, for example.

2. Description of the Related Art

In the related art, in chip-type electronic components, external electrodes are formed by applying conductive paste to the outer surface of the chip-type electronic components. To apply such conductive paste to chip-type electronic components with high precision, an aligning apparatus 1001 shown in FIG. 15 is used in Japanese Unexamined Patent Application Publication No. 2001-345240.

In the aligning apparatus 1001, a guide plate 1003 having a plurality of through-holes 1003a is mounted on a bed 1002. Chip-type electronic components 1004 are inserted in the individual through-holes 1003a of the guide plate 1003.

The chip-type electronic components 1004 have a rectangular parallelepiped shape. One end along the length of the chip-type electronic components 1004 projects upwards from the through-holes 1003a. As shown in FIG. 16, as seen in plan view, the dimension along the diagonal of the chip-type electronic components 1004, and the inside diameter of the through-holes 1003a are set to be substantially equal. Thus, the chip-type electronic components 1004 are held within the through-holes 1003a in proper orientation without rattling.

As shown in FIG. 15, a film 1006 having an adhesive layer 1005 formed on the lower surface is stuck onto the lower surface of a top plate 1007. In this case, the top plate 1007 is lowered to bring the adhesive layer 1005 into contact with one end of the chip-type electronic components 1004. In that state, the top plate 1007 is moved upwards, and the chip-type electronic components 1004 are immersed into a conductive paste layer from the side of the chip-type electronic components 1004 opposite to the side fixed to the adhesive layer 1005, thereby applying conductive paste.

In recent years, in the field of chip-type electronic components, there has been a strong demand for smaller size, particularly lower height. Accordingly, chip-type electronic components are made thinner and thinner. As miniature electronic components thus become increasingly thinner, it is becoming more and more difficult to apply conductive paste to a large number of chip-type electronic components with high precision by use of the aligning apparatus 1001 described in Japanese Unexamined Patent Application Publication No. 2001-345240. This is illustrated in FIGS. 17A to 19B.

FIGS. 17A and 17B are a schematic plan view and a partially cut-away front sectional view, respectively, showing a state in which a thin chip-type electronic component 1010 is inserted in each of the through-holes 1003a in proper orientation. While there would be no problem if the chip-type electronic component 1010 is held within the through-hole 1003a in proper orientation, due to the small thickness of the chip-type electronic component 1010, the chip-type electronic component 1010 tends to move in the direction of an arrow A in FIG. 17A.

As shown in FIGS. 18A and 18B, there are also cases when the chip-type electronic component 1010 tilts obliquely within each of the through-holes 1003a. Further, as shown in FIGS. 19A and 19B, there are also cases when two chip-type electronic components 1010 are erroneously inserted in a single through-hole 1003a.

Accordingly, in the case where the aligning apparatus 1001 having the though-holes 1003a that are circular in plan view as described in Japanese Unexamined Patent Application Publication No. 2001-345240 is used, it is not possible to adapt to thickness reduction of chip-type electronic components. If the chip-type electronic component 1010 is placed within each of the through-holes 1003a in the manner as shown in FIGS. 18A, 18B, 19A and 19B, the chip-type electronic component 1010 cannot be held in proper orientation when brought into contact with the adhesive layer 1005 mentioned above. Accordingly, it is impossible to apply conductive paste to a specific portion of the chip-type electronic component 1010 with high precision.

SUMMARY OF THE INVENTION

Preferred embodiments of the present invention provide a component aligning apparatus which enables a plurality of chip-type electronic components to be aligned in proper orientation even if the chip-type electronic components are made thinner, and accordingly makes it possible to apply, for example, conductive paste to the chip-type electronic components with high precision. Also, preferred embodiments of the present invention provide an electronic component manufacturing method using the component aligning apparatus.

According to a preferred embodiment of the present invention, a component aligning apparatus includes a component aligning jig to align electronic components. The electronic components to be aligned preferably have a rectangular parallelepiped shape whose length dimension is L, width dimension is W, and thickness dimension is T, and among outer surfaces of the electronic components, a surface along a length direction and a width direction is defined as a WL surface, a surface along the width direction and a thickness direction is defined as a WT surface, and a surface along the length direction and the thickness direction is defined as an LT surface. The component aligning jig includes a plurality of accommodating recesses opening on a surface, a depth Z of the accommodating recesses is set shorter than the length L of the electronic components so that a single one of the electronic components is held in each of the accommodating recesses while partially projecting upwards from each of the accommodating recesses with the WT surface on one side facing up, and letting S be a shortest separation that is larger than the thickness dimension T and is a narrowest distance between opposing inside surfaces of each of the accommodating recesses when each of the accommodating recesses is seen in plan view, W>S>T.

In a specific preferred embodiment of the component aligning apparatus according to the present invention, the component aligning apparatus further includes a guide plate that is mounted on top of the component aligning jig to guide a single one of the electronic components to each of the accommodating recesses of the component aligning jig, the guide plate includes a plurality of through-holes extending through the guide plate from an upper surface toward a lower surface, and letting D be a diameter of the through-holes, L>D>W.

In another specific preferred embodiment of the component aligning apparatus according to the present invention, the component aligning apparatus further includes a feed-in jig to feed a single one of the electronic components into each of the through-holes of the guide plate, the feed-in jig being mounted on top of a stacked body in which the guide plate and the component aligning jig are stacked, the feed-in jig includes a plurality of recesses on one surface, and the recesses are arranged so as to accommodate each of the electronic components with the WL surface of each of the electronic components facing down. Accordingly, by placing the feed-in jig on top of the stacked body in which the guide plate and the component aligning jig are stacked so that the recesses of the feed-in jig face the through-holes of the guide plate, the electronic components accommodated in the recesses of the feed-in jig can be easily dropped into the through-holes and, therefore, the electronic components can be accommodated in the accommodating recesses of the component aligning jig in proper orientation more reliably.

In still another specific preferred embodiment of the component aligning apparatus according to the present invention, within each of the accommodating recesses of the component aligning jig, a plurality of protrusions that project toward an inside of each of the accommodating recesses from an inside surface facing each of the accommodating recesses of the aligning jig are arranged so as to define a first stripe-shaped space and a second stripe-shaped space that cross each other in plan view, and letting x be a width of the first stripe-shaped space and the second stripe-shaped space, $W > x > T$, and letting y be a length of the stripe-shaped spaces, $y > W$. In this case, chip-type electronic components are each reliably positioned and accommodated within the first or second stripe-shaped space in the component aligning jig.

In yet still another specific preferred embodiment of the component aligning apparatus according to the present invention, the first and second stripe-shaped spaces define a cross-shaped space in plan view. In this case, since the first and second stripe-shaped spaces are substantially orthogonal to each other, chip-type electronic components supplied in various orientations can each be accommodated in the first or second stripe-shaped space reliably and easily.

An electronic component manufacturing method according to another preferred embodiment of the present invention relates to an electronic component manufacturing method using the component aligning apparatus configured in accordance with a preferred embodiment of the present invention, and includes the steps of preparing electronic components preferably having a rectangular parallelepiped shape whose length dimension is L, width dimension is W, and thickness dimension is T and in which $L > W > T$, and inserting the electronic components into the accommodating recesses of the electronic component aligning jig, with the WT surface positioned on an upper side and projecting upwards from a surface of the aligning jig.

In a specific preferred embodiment of the electronic component manufacturing method according to the present invention, the electronic component manufacturing method further includes the steps of abutting an adhesive holding member onto the WT surface on the upper side of the electronic components accommodated in the accommodating recesses of the aligning jig, transporting the electronic components while holding the electronic components by the adhesive holding member, by moving the adhesive holding member away from the aligning jig, and immersing the electronic components into a conductive paste from the WT surface on a side of the electronic components opposite to a side stuck on the adhesive holding member. In this case, after aligning the electronic components by the component aligning apparatus according to a preferred embodiment of the present invention, by transporting the electronic components on the adhesive holding member, and bringing the electronic components held by the adhesive holding member into contact with the conductive paste in proper orientation, the conductive paste can be applied to the electronic components with high precision from the WT surface side of the electronic components.

In another specific preferred embodiment of the electronic component manufacturing method according to the present invention, prior to accommodating the electronic components into the accommodating recesses of the aligning jig, the guide plate is mounted on a top surface of the aligning jig, and the electronic components are inserted into the accommodating recesses of the aligning jig via the through-holes of the guide plate. In this case, the electronic components are quickly supplied to the accommodating recesses of the aligning jig from the through-holes of the guide plate.

In still another specific preferred embodiment of the electronic component manufacturing method according to the present invention, the electronic component manufacturing method further includes the steps of, prior to inserting the electronic components into the through-holes of the guide plate, accommodating the electronic components into the recesses of the feed-in jig, mounting the feed-in jig on top of the guide plate so that the recesses of the feed-in jig face the through-holes, above the stacked body of the guide plate and the aligning jig, and dropping the electronic components accommodated in the recesses of the feed-in jig into the through-holes of the guide plate.

In the component aligning apparatus according to various preferred embodiments of the present invention, since the shortest separation S between the inside surfaces of each accommodating recess of the component aligning jig is set as $W > S > T$, the electronic components can be reliably positioned in the accommodating recesses in proper orientation, even as the electronic components are made thinner. Accordingly, by simply inserting the electronic components into the accommodating recesses of the component aligning apparatus mentioned above in accordance with the electronic component manufacturing method according to another preferred embodiment of the present invention, a plurality of electronic components can be aligned and held in a plurality of accommodating recesses reliably and properly.

Thus, for example, it becomes possible to pick up the plurality of aligned electronic components by using the adhesive holding member or the like, and perform application of conductive paste or the like with high precision and ease.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 19A and 19B are a schematic plan view and a schematic partially cut-away front sectional view, respectively, showing a state in which a plurality of electronic components are accommodated in a single accommodating recess in a component aligning apparatus in the related art.

DETAILED DESCRIPTION OF THE PREFERRED EMBODIMENTS

The present invention will be explained below by describing specific preferred embodiments of the present invention with reference to the drawings.

Figure 1A:
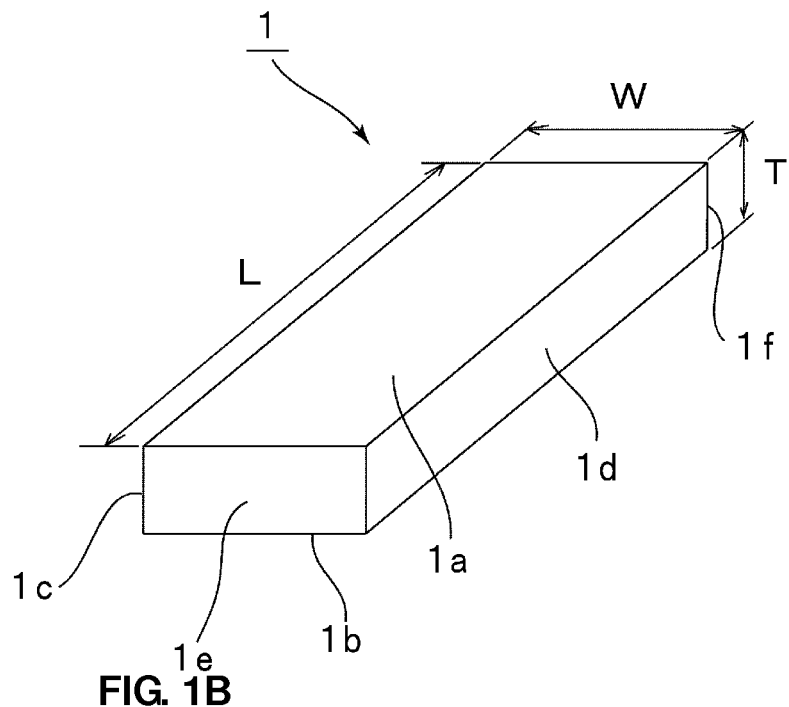
FIG. 1A is a perspective view of each electronic component to be aligned according to a preferred embodiment of the present invention.
Figure 1B:
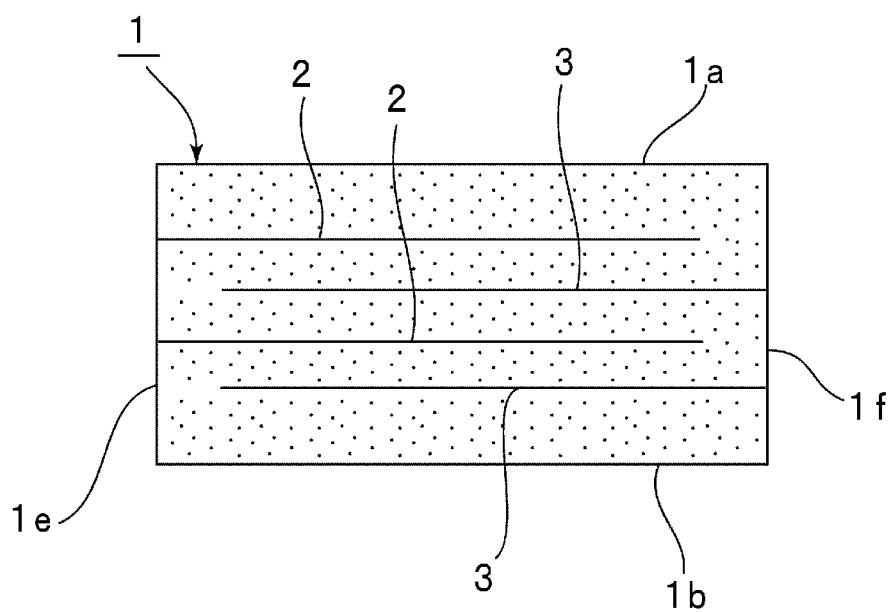
FIG. 1B is a front sectional view thereof.

FIG. 1A is a perspective view and FIG. 1B is a front sectional view showing each electronic component to be aligned according to a preferred embodiment of the present invention.

Chip-like electronic components 1 each preferably have a rectangular parallelepiped shape. Let L, W, and T be the length, width, and thickness dimensions of the electronic components 1, respectively. Depending on the case, for ease of explanation, the outer surfaces of the electronic components 1 will be expressed by referring the surface along the length direction and the width direction as WL surface, the surface along the width direction and the thickness direction as WT surface, and the surface along the length direction and the thickness direction as LT surface. For example, an upper surface 1a and a lower surface 1b of the electronic components 1 are each a WL surface. Also, side surfaces 1c and 1d extending in the length direction are each an LT surface, and a pair of side surfaces 1e and 1f extending in the width direction are each a WT surface.

The electronic components 1 to be aligned according to this preferred embodiment preferably are multilayer capacitor chips prior to formation of external electrodes. That is, as shown in FIG. 1B, in each of the electronic components 1, first internal electrodes 2 and second internal electrodes 3 are arranged so as to be stacked on each other with ceramic layers disposed therebetween, within a ceramic body having a rectangular parallelepiped shape. The internal electrodes 2 extend out to the side surface 1e, and the internal electrodes 3 extend out to the side surface 1f.

In this preferred embodiment, external electrodes are formed preferably by applying and firing conductive paste onto the side surfaces 1e and 1f of the electronic components 1. A component aligning apparatus according to this preferred embodiment aligns a plurality of electronic components 1 prior to applying the conductive paste, in order to apply the conductive paste with high precision.

Hereinbelow, an electronic component manufacturing method using the component aligning apparatus according to this preferred embodiment will be described with reference to FIGS. 2A to 10B.

First, the electronic components 1 shown in FIGS. 1A and 1B are each prepared. As previously mentioned, electronic components such as multilayer capacitors are rapidly becoming smaller and thinner. As a result, as the electronic components 1, those with dimensions on the order of L=1.0 mm, W=0.5 mm, and T=0.15 mm, for example, are being manufactured.

Figure 4:
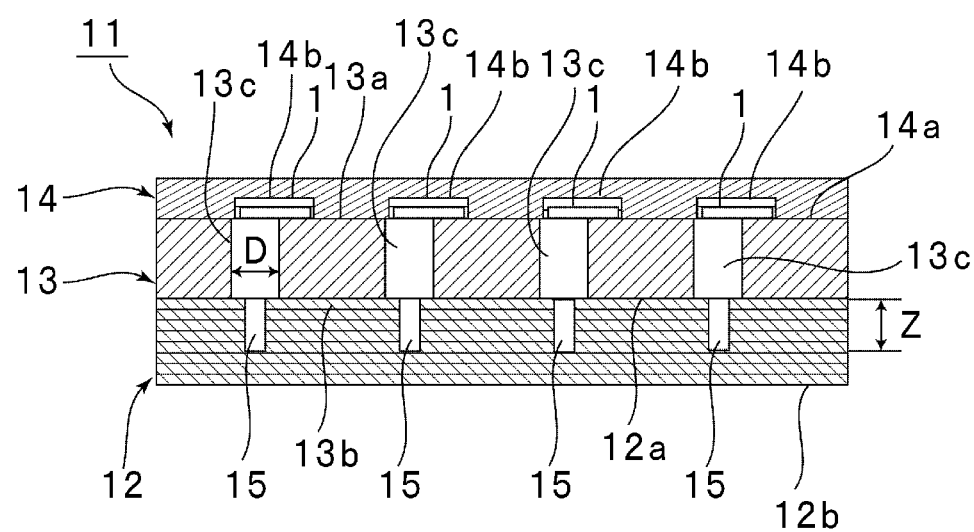
FIG. 4 is a front sectional view showing a component aligning apparatus according to a preferred embodiment of the present invention.

In this preferred embodiment, first, the electronic components 1 mentioned above are each prepared. The plurality of electronic components 1 are aligned by using the component aligning apparatus according to this preferred embodiment. In FIG. 4, the overall structure of a component aligning apparatus according to this preferred embodiment is shown in a schematic front sectional view. The component aligning apparatus 11 includes a component aligning jig 12, a guide plate 13 placed on top of the component aligning jig 12, and a feed-in jig 14 placed on top of the guide plate 13.

Figure 2A:
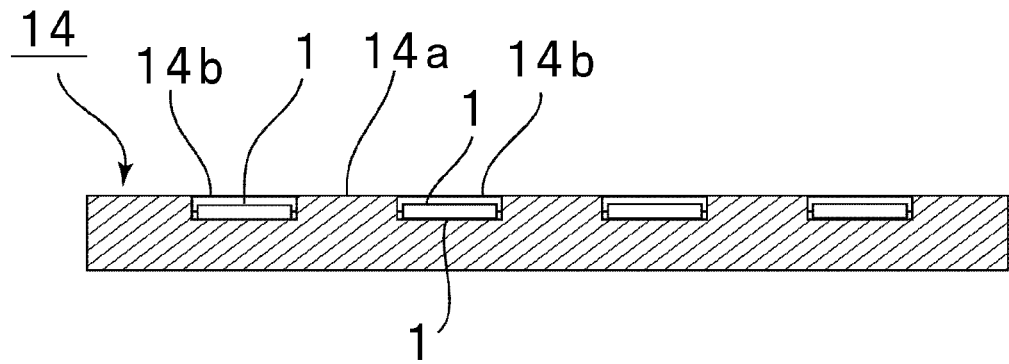
FIGS. 2A and 2B are a front sectional view and a plan view, respectively, showing a state in which electronic components are accommodated in recesses of a feed-in jig prepared according to a preferred embodiment of the present invention.
Figure 2B:
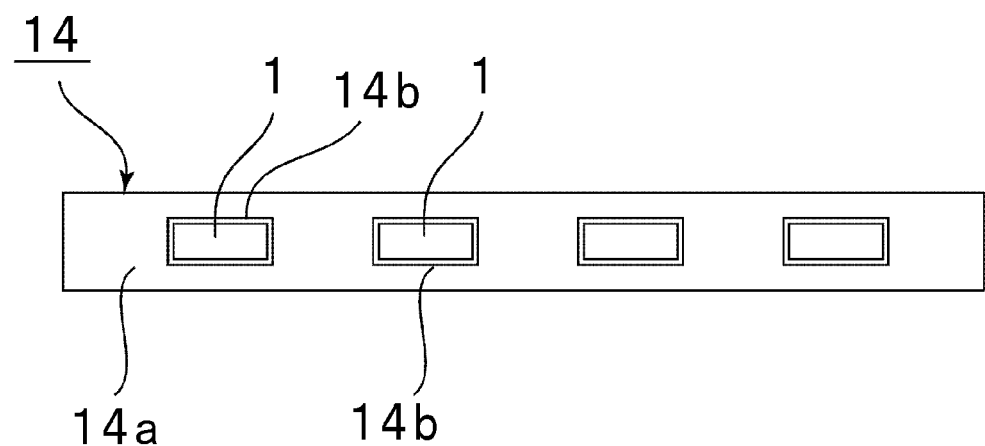
Figure 7A:
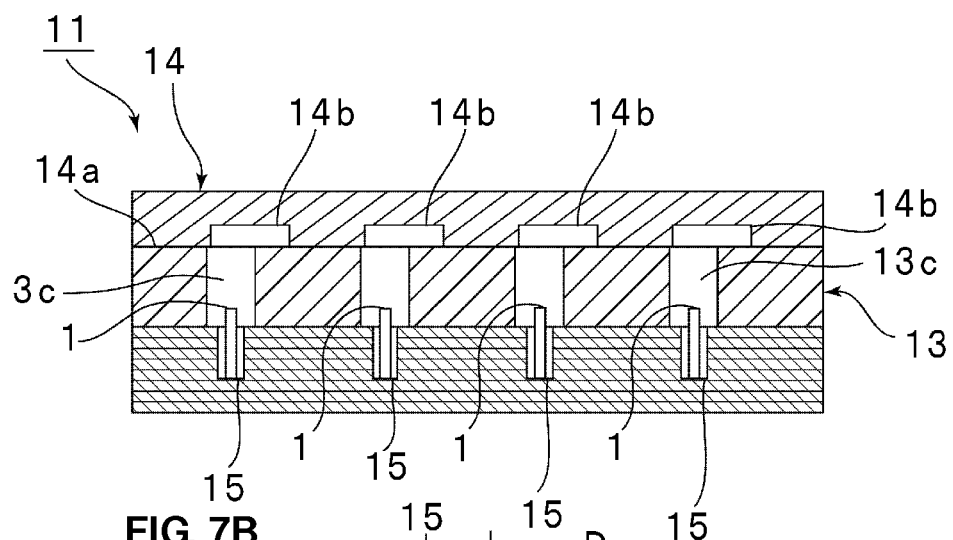
FIG. 7A is a front sectional view showing a state in which electronic components are accommodated in accommodating recesses.

FIGS. 2A and 2B are a front sectional view and a plan view, respectively, of the feed-in jig 14 mentioned above. In FIGS. 4 and 7A, as will be described later, the feed-in jig 14 is depicted as being turned upside down.

As shown in FIGS. 2A and 2B, the feed-in jig 14 preferably includes a rectangular plate-shaped member, for example. The feed-in jig 14 can be formed of an appropriate rigid material such as metal.

A plurality of recesses 14b are formed on one principal surface 14a of the feed-in jig 14. The plurality of recesses 14b preferably have a rectangular opening. The recesses 14b are formed so as to accommodate each of the electronic components 1 with the aforementioned WL surface of each of the electronic components 1 facing down. Accordingly, the plan shape of the recesses 14b is desirably equal to or slightly larger than the WL surface of the electronic components 1.

Figure 3:
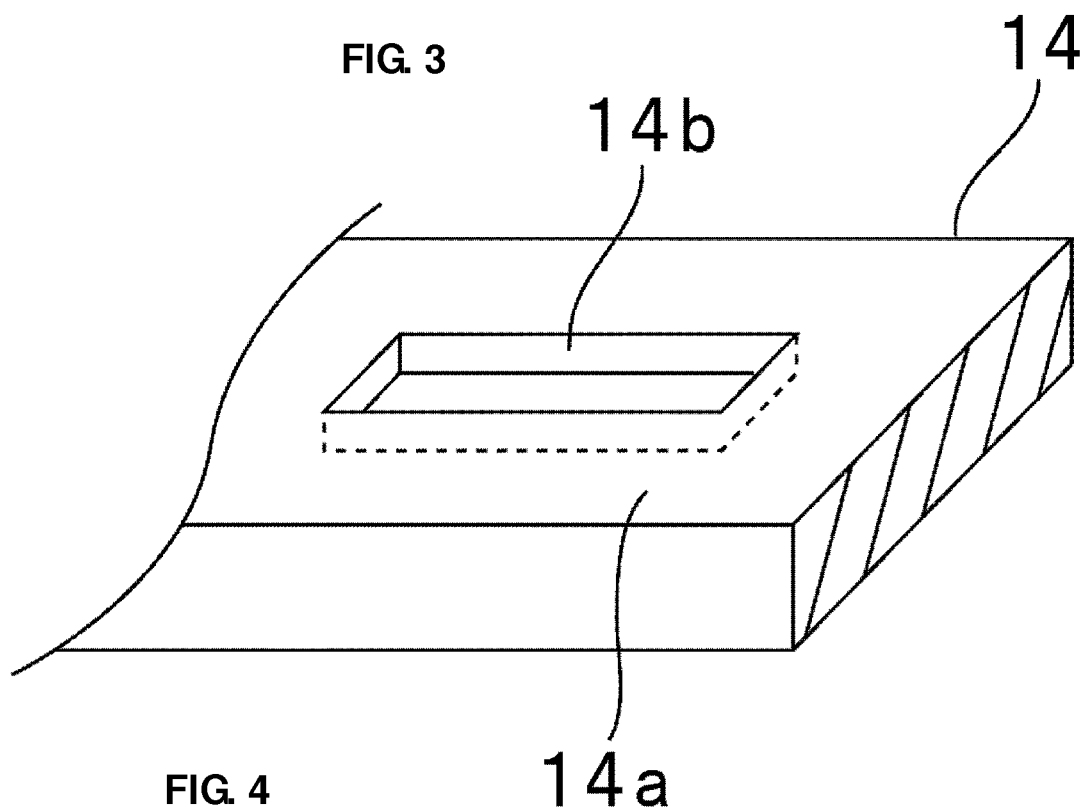
FIG. 3 is a schematic perspective view for explaining the shape of a recess in a feed-in jig according to a preferred embodiment of the present invention.

FIG. 3 is a perspective view extracting and showing in enlarged form only the portion where a single recess 14b is provided.

In this preferred embodiment, the length, width, and depth of the recesses 14b are set to such values that allow the electronic components 1 with L=1.00, width W=0.5 mm, and thickness T=0.15 mm to be accommodated without much difficulty.

Figure 5A:
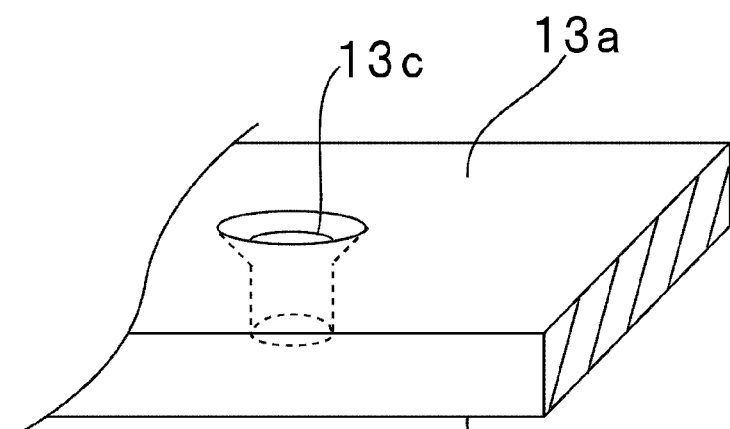
FIGS. 5A and 5B are a schematic perspective view and a partially cut-away front sectional view, respectively, for explaining a preferred modification of a single through-hole in a guide plate prepared according to a preferred embodiment of the present invention.
Figure 5B:
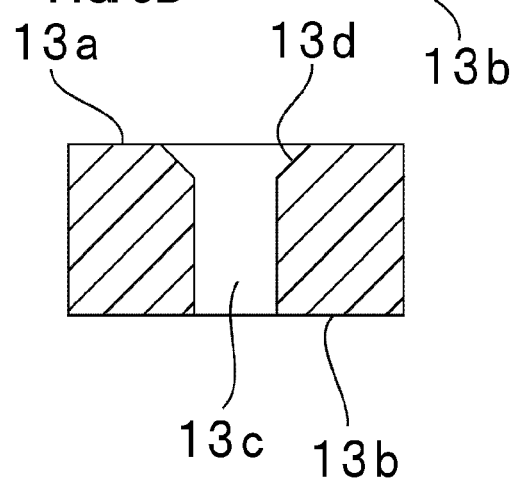

The guide plate 13 shown in FIG. 4 is made of a rigid material such as metal. The guide plate 13 is a plate-shaped member, and includes a plurality of through-holes 13c extending through the guide plate 13 from an upper surface 13a toward a lower surface 13b. Letting D be the diameter of the through-holes 13c, D preferably satisfies the condition L>D>W. In FIGS. 5A and 5B, the portion where a single through-hole 13c is provided is enlarged and shown in perspective view and front sectional view, respectively.

Although schematically shown in FIG. 4, preferably, as shown in FIGS. 5A and 5B, the through-holes 13c are tapered along the depth direction from the opening so that on the upper surface 13a side of the guide plate 13, the opening is larger than the lower portion of the through-holes 13c. That is, it is desirable that the through-holes 13c be provided with a tapered surface 13b curved in the shape of a truncated cone. Thus, the electronic components 1 can be guided into the through-holes 13c from above without much difficulty. However, the tapered surface 13d may not necessarily be provided.

As shown in FIG. 4, the component aligning jig 12 preferably includes a plate-shaped member including an upper surface 12a and a lower surface 12b. This plate-shaped member is preferably formed by stacking a plurality of sheets. A plurality of accommodating recesses 15 opening on the upper surface 12a are provided. The accommodating recesses 15 include a bottom, and open toward the upper surface 12a. As for the depth Z of the accommodating recesses 15, the portion where each of the accommodating recesses 15 is formed is shown in schematic plan view and partially cut-away front sectional view in FIGS. 6A and 6B, respectively.

Figure 6A:
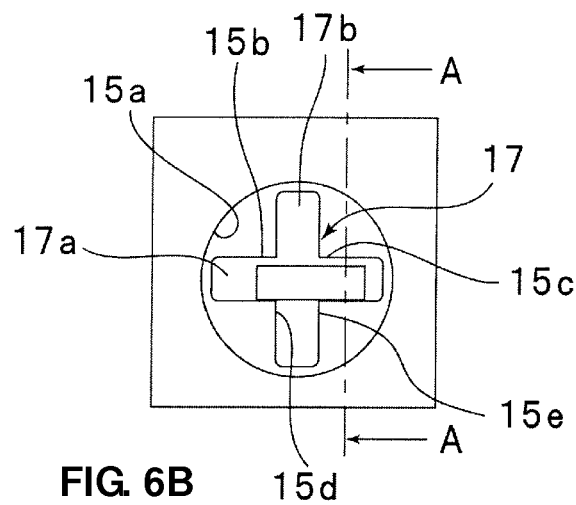
FIG. 6A is a plan view of a single accommodating recess in a component aligning jig according to a preferred embodiment of the present invention.
Figure 6B:
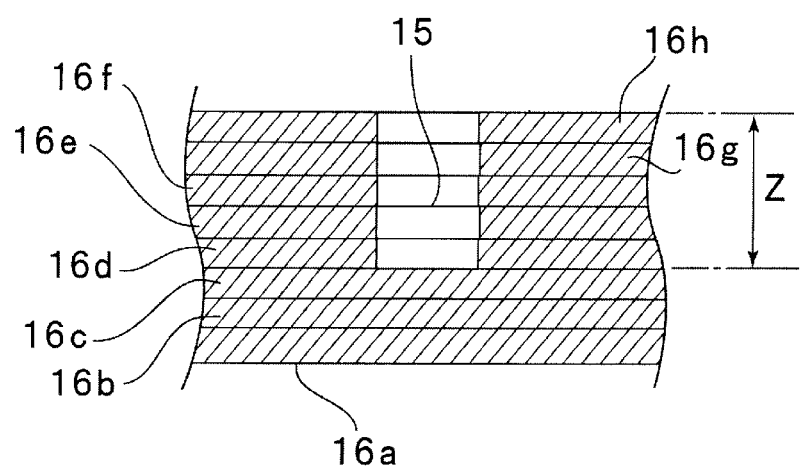
FIG. 6B is a partially cut-away front sectional view taken along the line A-A of FIG. 6A, showing a portion where the accommodating recess is provided.

As is apparent from FIGS. 6A and 6B, the component aligning jig 12 is formed by stacking sheets 16a to 16h from the bottom in this order.

Figure 6C:
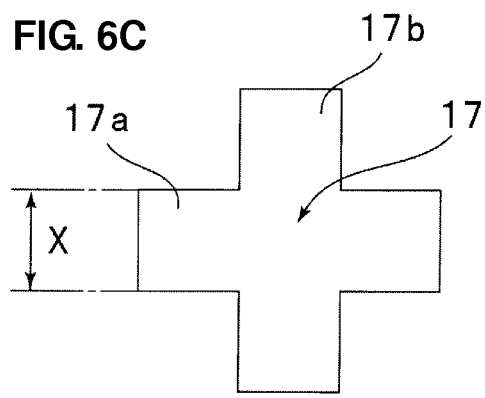
FIG. 6C is a schematic plan view for explaining a stripe-shaped space.

On the other hand, a cross-shaped through-hole shown in FIG. 6C is formed in the sheets 16a to 16h, thereby forming a cross-shaped space 17 in plan view.

In other words, the cross-shaped space 17 is defined by forming, within each of the accommodating recesses 15, a plurality of protrusions 15b to 15e that project inwards from the inner wall of each recess. The cross-shaped space 17 is a space where a first stripe-shaped space 17a and a second stripe-shaped space 17b are provided so as to be orthogonal to each other. The first stripe-shaped space 17a and the second stripe-shaped space 17b preferably have the same size.

Preferably, letting x be the width of the first stripe-shaped space 17a and second stripe-shaped space 17b, W>x>T, and letting y be the length of the first and second stripe-shaped spaces 17a and 17b, y>W. Thus, as will be described later, the electronic components 1 can be accommodated within the accommodating recesses 15 in proper attitude without much difficulty.

However, y may not necessarily be set as y>W.

In this preferred embodiment, letting S be the shortest separation representing the narrowest distance between opposing inside surfaces of each of the above-mentioned accommodating recesses 15, W>S>T. In this case, as is apparent from FIG. 6C, the above-mentioned shortest separation S in each of the accommodating recesses 15 according to this preferred embodiment is the widthwise dimension x of the first and second stripe-shaped spaces 17a and 17b. Accordingly, W>x>T.

As will be apparent from modifications described later, the plan shape of the accommodating recesses 15 can be modified as appropriate as long as the shortest separation S mentioned above can be set.

In this preferred embodiment, as shown in FIG. 6B, the above-mentioned cross-shaped space 17 is formed in the sheets 16h to 16d. Accordingly, each of the accommodated electronic components 1 can be corrected for its attitude by two cross-shaped spaces 17, thereby making it possible to accommodate the electronic components 1 with a proper attitude more reliably.

While in this preferred embodiment the first stripe-shaped space 17a and the second stripe-shaped space 17b are preferably arranged to be orthogonal to each other, the first stripe-shaped space 17a and the second stripe-shaped space 17b may not necessarily be orthogonal to each other but may cross each other at other angles.

The sheets 16a to 16h of the component aligning jig 12 mentioned above can be formed by, for example, laminating sheets made of an appropriate material such as ceramic together as appropriate, or laminating resin sheets or metal sheets together.

Next, an electronic component manufacturing method using the component aligning apparatus 11 according to the present preferred embodiment will be described.

First, as shown in FIGS. 2A and 2B, the feed-in jig 14 is placed in such a way that the one principal surface 14a of the feed-in jig 14 faces up. In this state, a large number of electronic components 1 are supplied from above and, for example, vibration is applied to the feed-in jig 14, thereby accommodating the electronic components 1 into the individual recesses 14b. In this case, a single electronic component 1 can be reliably accommodated into a single recess. Thereafter, electronic components on the one principal surface 14a which are not accommodated in the recesses 14b are removed. In this way, the state shown in FIGS. 2A and 2B is realized.

A stacked body in which the guide plate 13 is stacked on top of the aforementioned component aligning jig 12 is prepared separately in advance. In this case, as shown in FIG. 4, the guide plate 13 is positioned on top of the component aligning jig 12 so that the through-holes 13c are located above the accommodating recesses 15.

Next, the feed-in jig 14 with the electronic components 1 accommodated in the individual recesses 14b are turned upside down as shown in FIG. 4 and mounted on top of the guide plate 13. This turning of the feed-in jig 14 upside down must be performed in such a way that the electronic components 1 being accommodated in the recesses 14b do not drop. For example, a stacked body made up of the guide plate 13 and the component aligning jig 14 may be mounted on the one principal surface 14a of the feed-in jig 14 shown in FIGS. 2A and 2B while being turned upside down from FIG. 4, and then the whole structure may be turned upside down again.

It should be noted that the feed-in jig 14 is positioned with respect to the guide plate 13 so that the recesses 14b of the feed-in jig 14 partially face the through-holes 13c of the guide plate 13. In this state, each of the electronic components 1 is partially in contact with the upper surface 13a of the guide plate 13, with the remainder positioned over each of the through-holes 13c. Next, by applying vibration to this stacked body from a vibration source, for example, the electronic components 1 are dropped into the through-holes 13c. Since the diameter D of the through-holes 13c is such that L>D>W, the electronic components 1 drop in such a way that the length direction is along the depth direction of the through-holes 13c. Also, a single electronic component 1 accommodated in a single recess 14b is reliably dropped into a single through-hole 13c. This prevents a plurality of electronic components 1 from entering a single through-hole 13c erroneously.

Figure 7B:
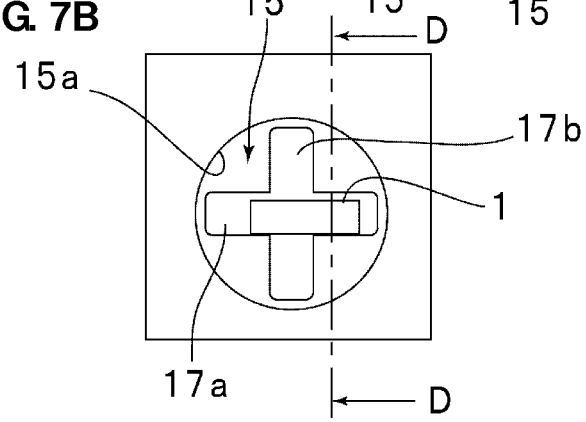
FIG. 7B is a schematic plan view taken along the line B-B of FIG. 7A, showing a state in which a single electronic component is accommodated in a single accommodating recess, in a manufacturing method according to a preferred embodiment of the present invention.

Then, the electronic components 1 to which vibration has been applied reach the inside of the above-mentioned accommodating recesses 15 of the component aligning jig 12 below the through-holes 13c, and are accommodated into the accommodating recesses 15 as shown in FIG. 7A. In this case, since the accommodating recesses 15 include a circular through-hole and the cross-shaped space 17, as shown in FIGS. 7A and 7B, each of the electronic components 1 is guided to each of the accommodating recesses 15 without much difficulty from an opening 15a that is a circular through-hole, and is further accommodated into the first stripe-shaped space 17a or the second stripe-shaped space 17b. That is, since the width x of the stripe-shaped spaces 17a and 17b is such that W>x>T, each of the electronic components 1 is accommodated into the first stripe-shaped space 17a or the second stripe-shaped space 17b without fail.

Accordingly, in the case where, for example, each of the electronic components 1 is accommodated in the first stripe-shaped space 17a as shown in FIG. 7B, even when the electronic component 1 tries to tilt, the electronic component 1 comes into contact with at least one of the above-mentioned protrusions 15b to 15e, which restricts its change in attitude. Thus, the elongated electronic components 1 can be reliably positioned so that the length direction is orientated substantially vertically.

In this case, letting Z be the depth of the accommodating recesses 15, Z<L. Accordingly, the electronic components 1 are accommodated in the accommodating recesses 15 in a state in which the WT surface on one side of the accommodated electronic components 1 projects upwards.

Figure 8:
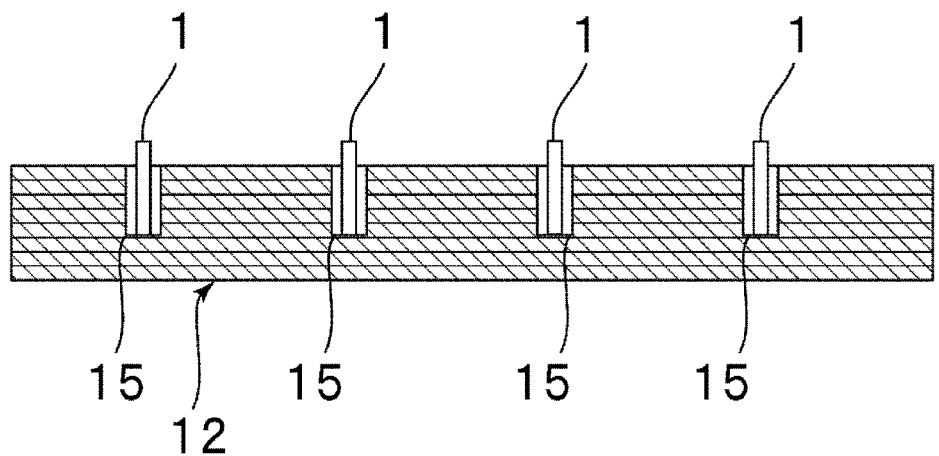
FIG. 8 is a front sectional view showing a state in which a plurality of electronic components are held by a component aligning jig, in a manufacturing method according to a preferred embodiment of the present invention.

Thus, when the guide plate 13 and the feed-in jig 14 are removed upwards in the state shown in FIG. 7A, as shown in FIG. 8, a plurality of electronic components 1 are aligned and held by the component aligning jig 12 so that the WT surface on one side of the plurality of electronic components 1 projects upwards.

Figure 9:
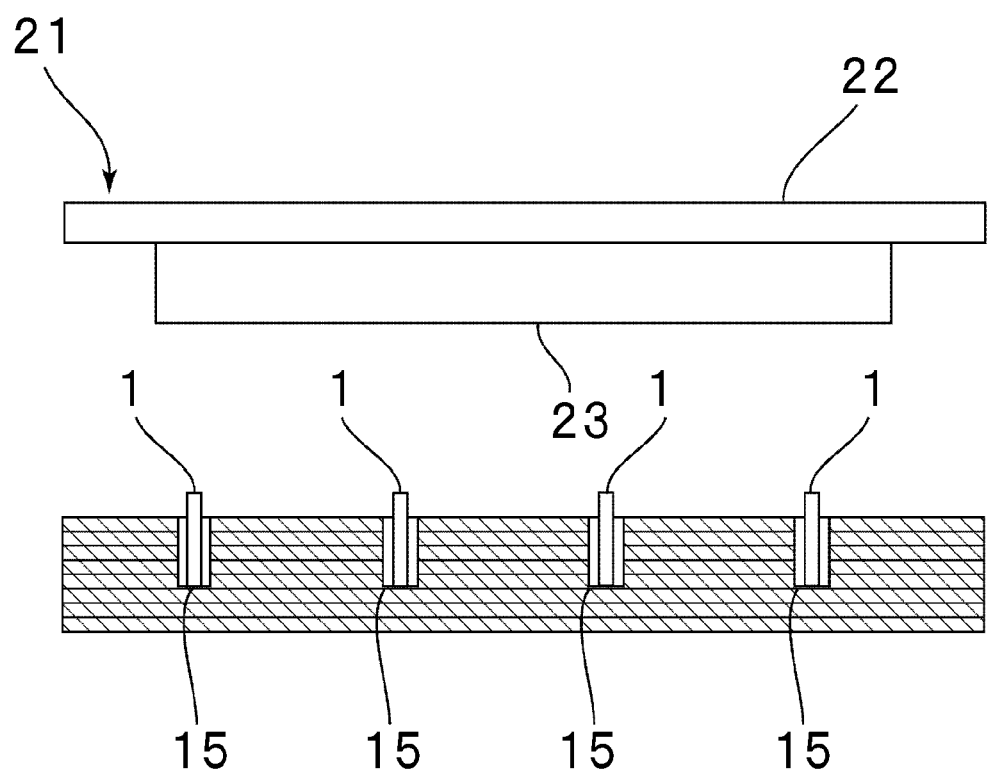
FIG. 9 is a schematic front sectional view for explaining the step of taking out electronic components from a component aligning jig by an adhesive holding member, according to a preferred embodiment of the present invention.

Next, as shown in FIG. 9, an adhesive holding member 21 is lowered from above. The adhesive holding member 21 includes a holder plate 22, and an adhesive layer 23 provided on the lower surface of the holder plate 22. When the adhesive layer 23 comes into contact with the WT surface located at the top end of the electronic components 1 mentioned above, due to its adhesive action, a plurality of electronic components 1 are held by the adhesive layer 23.

Figure 10A:
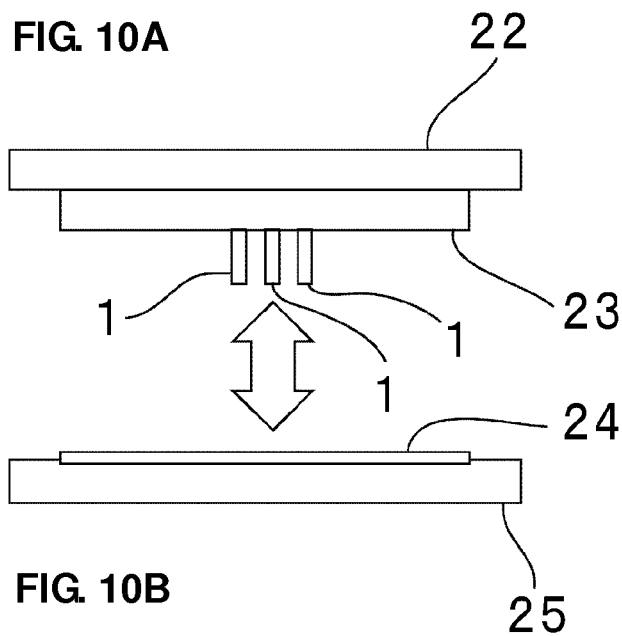
FIG. 10A is a schematic front sectional view for explaining the step of applying conductive paste to a plurality of electronic components held by an adhesive holding member.
Figure 10B:
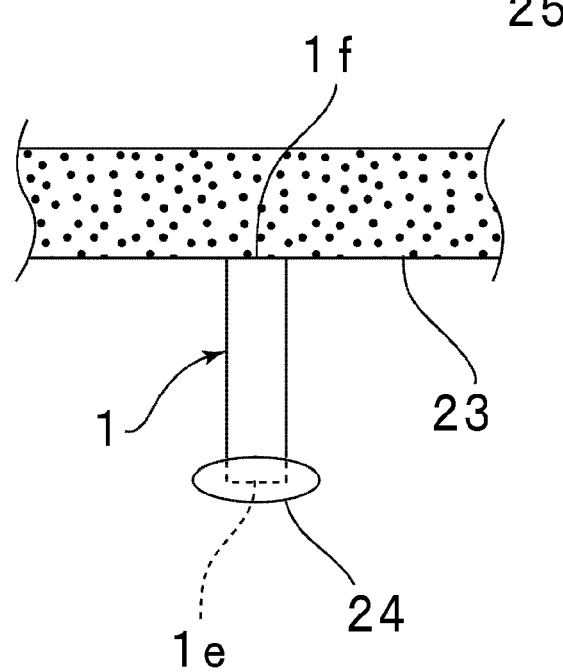
FIG. 10B is a partially cut-away front sectional view showing a state in which conductive paste is applied to a WT surface of an electronic component.

Thereafter, the adhesive holding member 21 is moved upwards together with the plurality of electronic components 1 being held, and is moved onto an application stage 25 in which a conductive paste layer 24 is formed, as schematically shown in FIG. 10A. In this state, the adhesive holding member 21 is lowered. In this way, conductive paste can be applied to the WT surface on one side of the electronic components 1. Since the electronic components 1 are reliably held in proper orientation with respect to the adhesive layer 23 of the adhesive holding member 21, by simply immersing the WT surface into the conductive paste provided below, the conductive paste can be applied to the WT surface with high precision as shown in FIG. 10B.

After the application of the conductive paste mentioned above, the conductive paste is dried, and further, conductive paste is also applied to the WT surface on the opposite side in the same manner as mentioned above. Thereafter, by heating the electronic components 1 applied with the conductive paste to fire the conductive paste, an external electrode can be formed on the WT surface on either side of the electronic components 1. In this way, in accordance with a preferred embodiment of the present invention, electronic components can be completed, and the precision of external electrodes can be enhanced.

As mentioned above, according to the manufacturing method in this preferred embodiment, even as the electronic components 1 become smaller, particularly thinner, since the component aligning jig 12 is formed such that W>S>T, in the accommodating recesses 15 of the component aligning jig 12, the electronic components 1 can be held reliably in proper orientation with the WT surface projecting upwards. Thus, it is possible to apply conductive paste to the WT surface of the electronic components 1 with high precision, even as the electronic components are made thinner.

Figure 11:
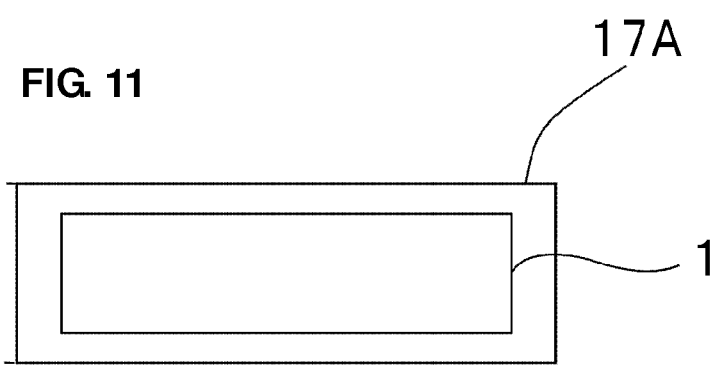
FIG. 11 is a schematic plan view for explaining a modification of a stripe-shaped space in an accommodating recess in a component aligning jig according to a preferred embodiment of the present invention.

While in the above preferred embodiments, the first and second stripe-shaped spaces 17a and 17b preferably cross each other to define the cross-shaped space 17, in the present invention, the plan shape of the accommodating recesses of the component aligning jig 12 is not limited to this. For example, as shown in FIG. 11, a single stripe-shaped space 17A may be provided. In FIGS. 11 to 14, the portion where each of the electronic components 1 is accommodated is schematically shown.

Figure 12:
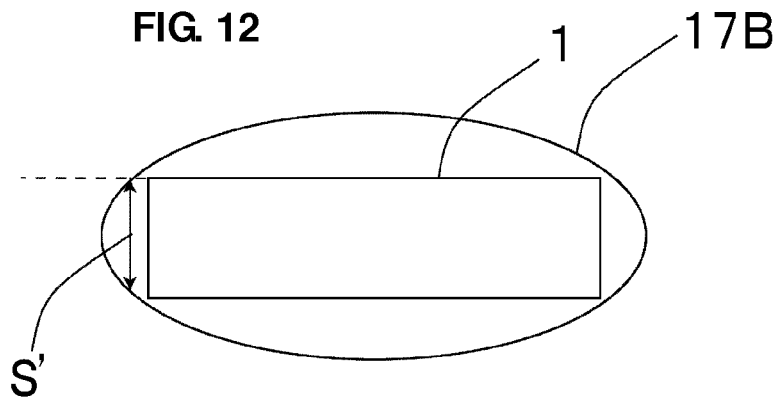
FIG. 12 is a schematic plan view for explaining another modification of a stripe-shaped space in an accommodating recess in a component aligning jig according to a preferred embodiment of the present invention.

In the stripe-shaped space 17A in FIG. 11, the widthwise dimension is the shortest separation S mentioned above. Also, as shown in FIG. 12, the above-mentioned stripe-shaped space 17A may have a rounded oblong shape. That is, an oblong-shaped space 17B may be provided. In this case, the shortest separation S larger than T is at the position shown in the drawing.

Figure 13A:
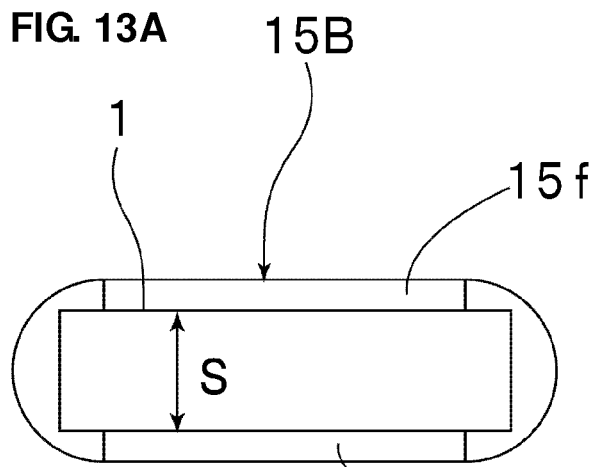
FIGS. 13A and 13B are each a schematic plan view for explaining still another modification of the shape of an accommodating recess according to a preferred embodiment of the present invention.

That is, in the present invention, the above-mentioned shortest separation S' strictly refers to the shortest separation among separations larger than the thickness T of the electronic components 1. Also, as shown in FIG. 13A, an accommodating recess 15B may have a shape such that a semicircular space lies continuously on either side in the length direction of a stripe-shaped space in plan view. In this case, it is desirable to provide protrusions 15f and 15g along either long side of the stripe-shaped space so as to project toward the other long side. The distance between the protrusions 15f and 15g represents the above-mentioned shortest separation S.

Figure 13B:
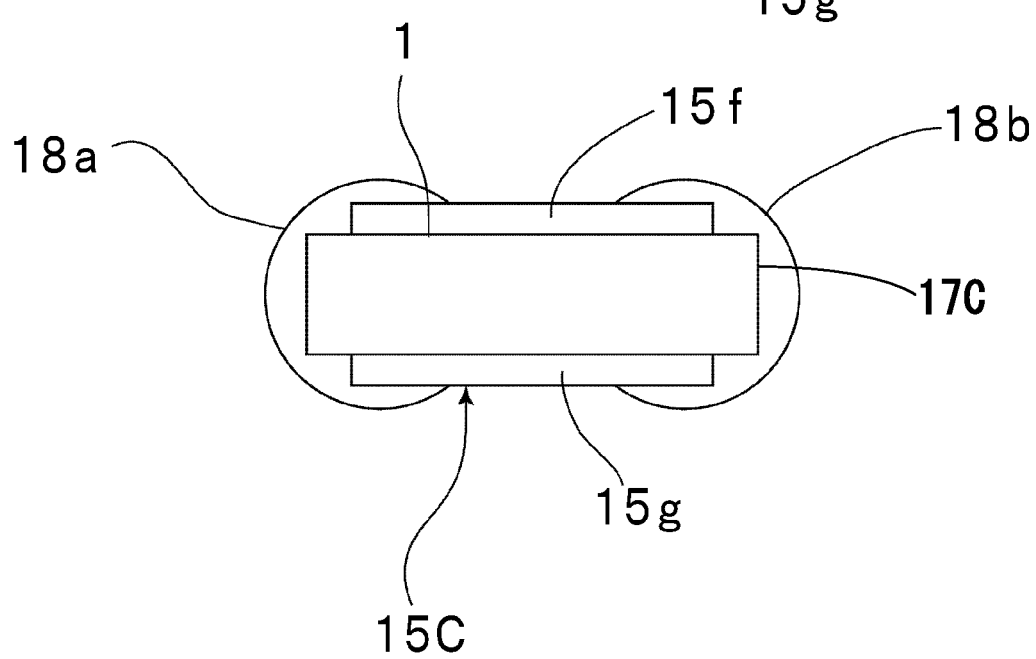

In the accommodating recess 15B shown in FIG. 13B, a stripe-shaped space 17C is combined with spaces 18a and 18b that are substantially circular in plan view, at both ends in the length direction of the stripe-shaped space 17C. In the case of such a plan shape as well, as in FIG. 12A, preferably, it is desirable to provide protrusions 15f and 15g extending from either long side of the stripe-shaped space 17C toward the other side. In that case, the distance between the protrusions 15f and 15g represents the shortest separation S'.

Figure 14:
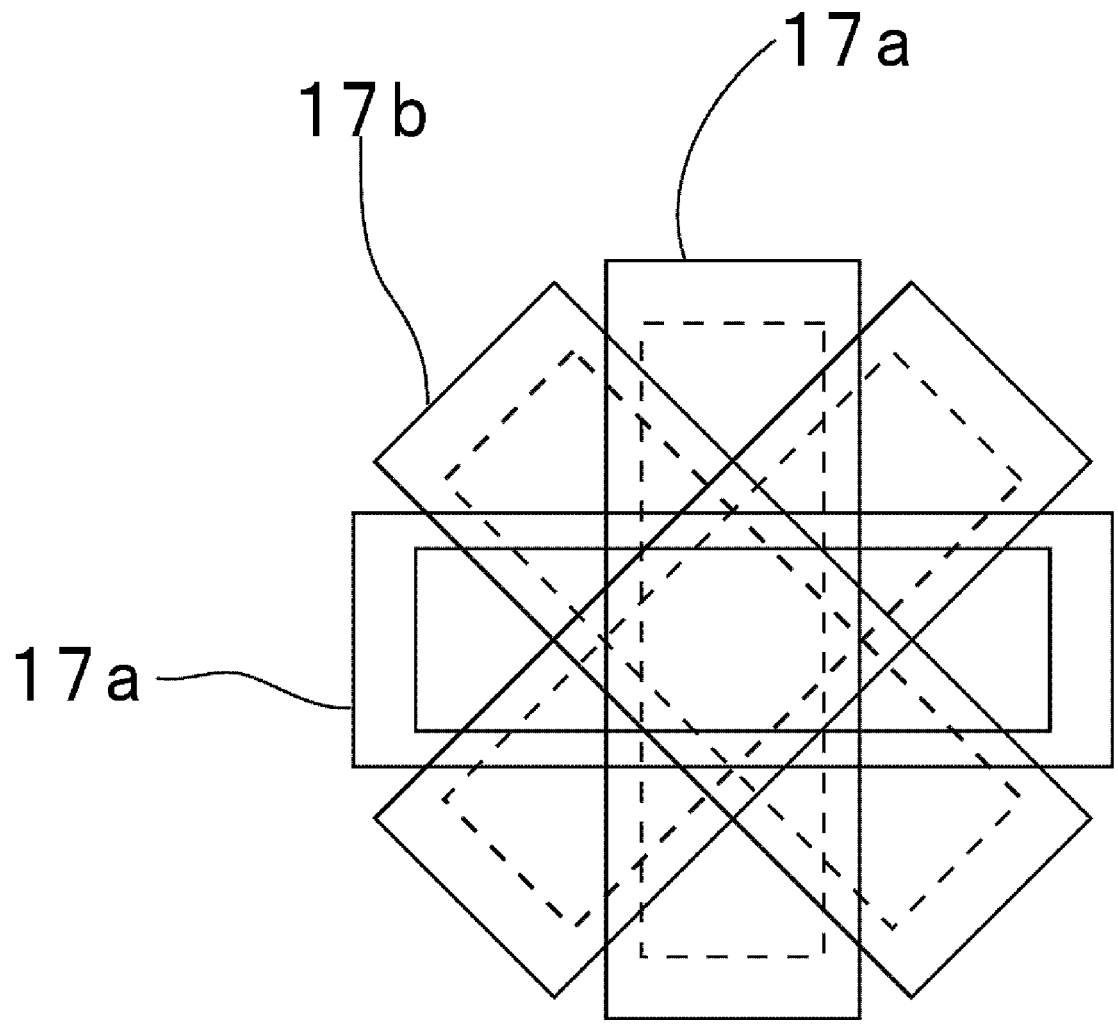
FIG. 14 is a schematic plan view for explaining yet still another modification of the shape of an accommodating recess according to a preferred embodiment of the present invention.
Figure 15:
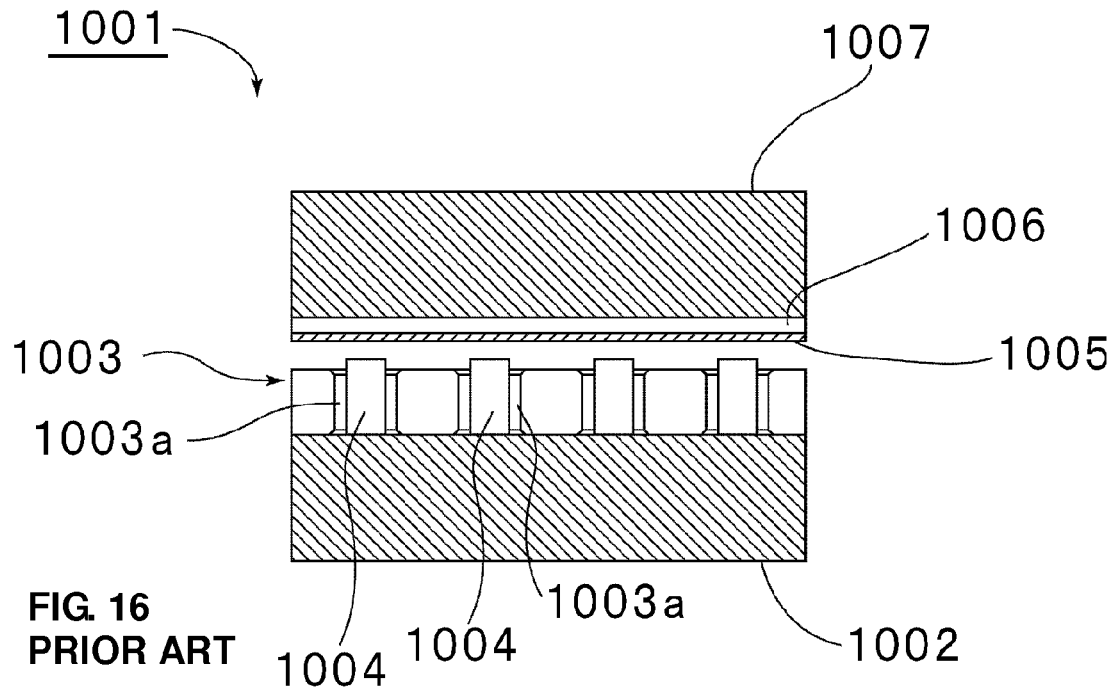
FIG. 15 is a front sectional view for explaining an example of a component aligning apparatus in related art.
Figure 16:
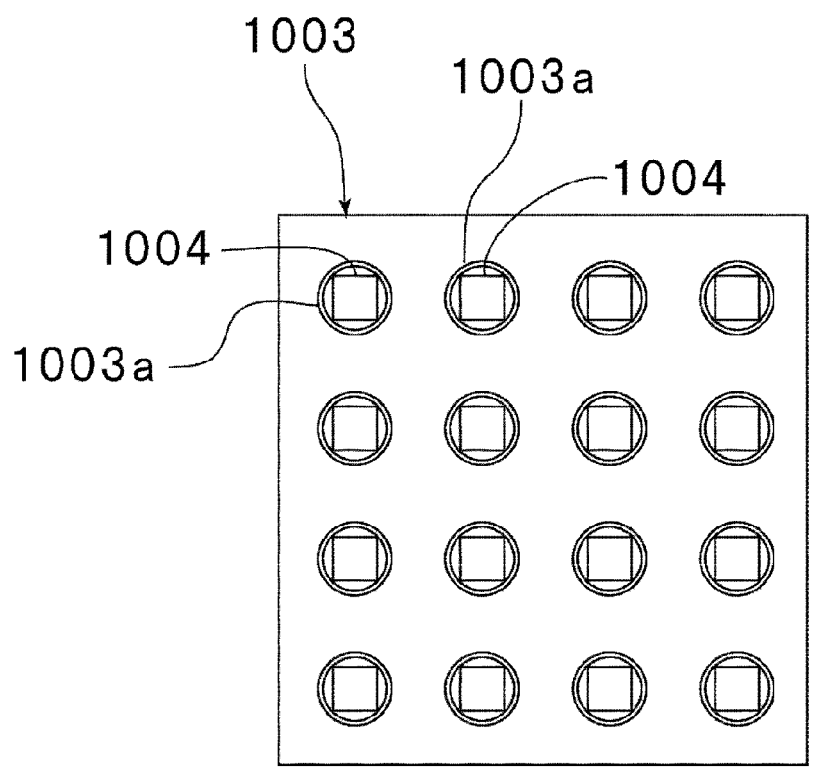
FIG. 16 is a schematic plan view of a guide plate of a component aligning apparatus in related art.
Figure 17A:
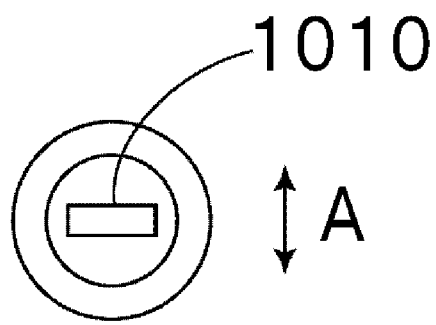
FIGS. 17A and 17B are a schematic plan view and a schematic partially cut-away front sectional view, respectively, showing a state in which an electronic component is placed in proper orientation in a component aligning apparatus in related art.
Figure 17B:
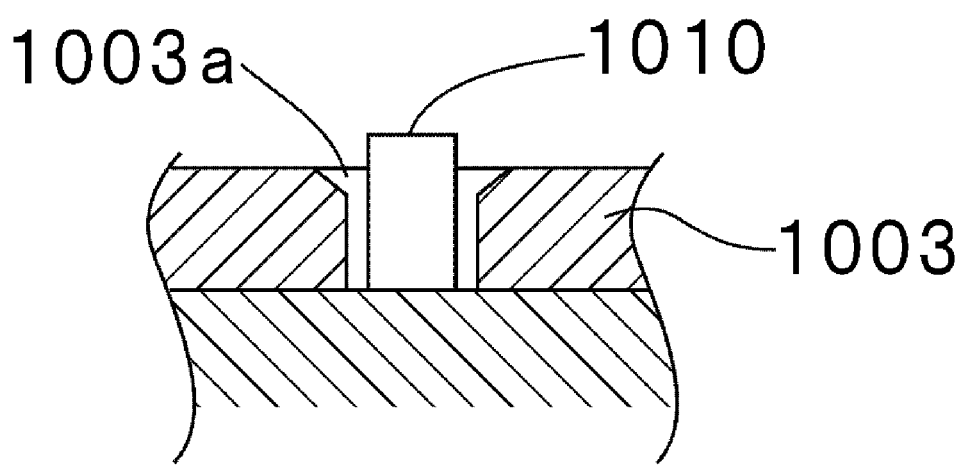
Figures 18A, 18B:
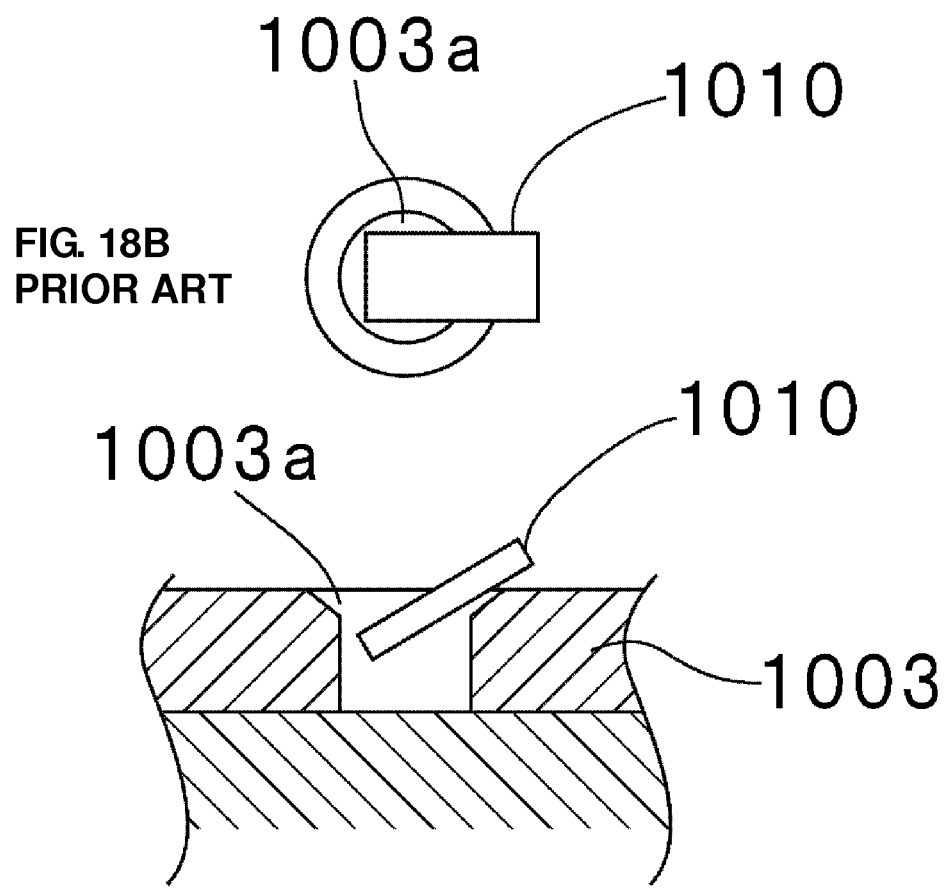
FIGS. 18A and 18B are a schematic plan view and a schematic partially cut-away front sectional view, respectively, showing a state in which an electronic component is accommodated in a tilted fashion in a component aligning apparatus in related art.

Also, as shown in FIG. 14, three or more stripe-shaped spaces 17a to 17c may be arranged to cross each other.

While in the above preferred embodiments, the manufacturing method for a multilayer capacitor has been described, the present invention can be applied to a wide variety of electronic components for which smaller size and lower profile are required.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A component aligning apparatus comprising:
   a component aligning jig arranged to align electronic components, wherein the electronic components to be aligned have a rectangular parallelepiped shape whose length dimension is L, width dimension is W, and thickness dimension is T, and among outer surfaces of the electronic components, a surface along a length direction and a width direction is defined as a WL surface, a surface along the width direction and a thickness direction is defined as a WT surface, and a surface along the length direction and the thickness direction is defined as an LT surface; wherein
   the component aligning jig includes a plurality of accommodating recesses opening on a surface, a depth Z of the accommodating recesses is shorter than the length L of the electronic components so that a single one of the electronic components is held in each of the accommodating recesses while partially projecting upwards from each of the accommodating recesses with the WT surface on one side facing up, and letting S be a shortest separation defined by a narrowest distance between opposing inside surfaces of each of the accommodating recesses among separations that are larger than the thickness dimension T when each of the accommodating recesses is seen in plan view, W>S>T; and
   the component aligning apparatus further comprises:
   a guide plate that is mounted on top of the component aligning jig to guide a single one of the electronic components to each of the accommodating recesses of the component aligning jig; wherein
   the guide plate includes an upper surface and a lower surface opposed to the upper surface; and
   the guide plate includes a plurality of through-holes extending through the guide plate from the upper surface toward the lower surface, and letting D be a diameter of each of the through-holes, L>D>W.

2. The component aligning apparatus according to claim 1, further comprising a feed-in jig arranged to feed a single one of the electronic components into each of the through-holes of the guide plate, the feed-in jig being mounted on top of a stacked body in which the guide plate and the component aligning jig are stacked, wherein the feed-in jig includes a plurality of recesses on one surface, and the recesses are arranged so as to accommodate each of the electronic components with the WL surface of each of the electronic components facing down.

3. The component aligning apparatus according to claim 1, wherein:
   within each of the accommodating recesses of the component aligning jig, a plurality of protrusions that project toward an inside of each of the accommodating recesses from an inside surface facing each of the accommodating recesses of the aligning jig are arranged so as to define a first stripe-shaped space and a second stripe-shaped space that cross each other in plan view; and
   letting x be a width of the first stripe-shaped space and the second stripe-shaped space, W>x>T, and letting y be a length of the stripe-shaped spaces, y>W.

4. The component aligning apparatus according to claim 3, wherein the first and second stripe-shaped spaces define a cross-shaped space in plan view.

* * * * *